United States Patent [19]

Salmen et al.

[11] Patent Number: 5,667,697
[45] Date of Patent: Sep. 16, 1997

[54] COLLOIDAL SILICA/POLYELECTROLYTE BLENDS FOR NATURAL WATER CLARIFICATION

[75] Inventors: Kristine S. Salmen; Pek Lee Choo, both of Naperville; David A. Picco, Shorewood; Michio Kobayashi, Aurora, all of Ill.

[73] Assignee: Nalco Chemical Company, Naperville, Ill.

[21] Appl. No.: 701,224

[22] Filed: Aug. 21, 1996

Related U.S. Application Data

[63] Continuation-in-part of Ser. No. 535,430, Sep. 28, 1995, abandoned.

[51] Int. Cl.[6] .................................................. C02F 1/56
[52] U.S. Cl. .......................... 210/727; 210/728; 210/731; 210/734; 210/735
[58] Field of Search ................................. 210/723, 727, 210/728, 734, 735, 731

[56] References Cited

U.S. PATENT DOCUMENTS

| | | |
|---|---|---|
| 3,822,216 | 7/1974 | Schaefer . |
| 3,855,145 | 12/1974 | Vossos . |
| 3,867,304 | 2/1975 | Mindick et al. . |
| 3,901,992 | 8/1975 | Payne et al. . |
| 4,153,548 | 5/1979 | Forney . |
| 4,308,149 | 12/1981 | Selvarajan . |
| 4,568,721 | 2/1986 | Fong et al. . |
| 4,655,934 | 4/1987 | Rose et al. . |
| 4,795,531 | 1/1989 | Sofia et al. . |
| 4,863,615 | 9/1989 | Stenger et al. . |
| 5,004,550 | 4/1991 | Beckman et al. . |

*Primary Examiner*—Neil McCarthy
*Attorney, Agent, or Firm*—Robert A. Miller; James J. Drake

[57] ABSTRACT

This invention relates to the clarification of natural waters containing turbidity-causing components. This method comprises the addition of a stable colloidal silica suspension and water based polymeric coagulant to the turbid water. The components of the invention may be added independently, or blended together so that addition is simultaneous. The colloidal silica may also be conditioned by passing over a cationic exchange resin prior to addition of cationic polymer.

12 Claims, No Drawings

COLLOIDAL SILICA/POLYELECTROLYTE BLENDS FOR NATURAL WATER CLARIFICATION

This application is a continuation-in-part of Ser. No. 08/535,430 entitled "Colloidal Silica/Polyelectrolyte Blends for Natural Water Clarification" by P. L. Choo, M. Kobayashi, D. A. Picco, and K. S. Salmen filed on Sep. 28, 1995, abandoned, the disclosure of which is incorporated herein by reference.

FIELD OF THE INVENTION

This invention relates to the clarification of natural waters containing turbidity-causing components. This method comprises the addition of a stable colloidal silica suspension and water based polymeric coagulant to the turbid water. The components of the invention may be added independently, or blended together so that addition is simultaneous. The colloidal silica may also be conditioned by passing over a cationic exchange resin prior to addition of cationic polymer.

BACKGROUND OF THE INVENTION

Turbidity-causing components can be any organic or inorganic species of sufficient particle or droplet size to create a turbid, light-dispersed appearance in waste waters, industrial waters, or natural waters. These turbidity-causing components can be of an inorganic nature, an organic nature, a color body, a pigment dispersion, an oil droplet, a colloidal humic material suspension, a dispersion formed from animal wastes in waters used to collect these animal wastes, sewage components, or admixtures of any of the above in any ratio in waters of any description thereby obtaining a turbid translucent effect.

Turbid waters are any type of waters having dispersed therein any type of turbidity-causing component, as described above, or any other type of turbidity-causing component which might be similar in effect when dispersed in these types of waters. For example, colloidal matter of either organic or inorganic or even mixed organic and inorganic character can be turbidity-causing. Such components may vary greatly in nature and concentration, but generally contain a highly anionic surface charge which causes the colloidal particles to repel one another, thus remaining dispersed in the water, rather than settling out in a reasonable time frame.

Examples of turbid waters include waste waters expelled from hydrocarbon processing plants, waste waters expelled from chemical processing plants which synthesize various types of rubber latexes, and effluent waters expelled from various kinds of processing plants using materials containing emulsified components which are of a hydrocarbon nature. Further, the waste waters may be from automotive plants or machining plant operations.

A common method for removal of suspended solids from various types of turbid waters is by the well-known chemical process of clarification. The primary unit operations in clarification are coagulation combined with or followed by flocculation. Coagulation is defined as neutralization of the surface charge on particles or droplets dispersed in the water. Flocculation is defined as the agglomeration or coalescence of small particles or droplets into larger particles or droplets, generally called floc.

A method of clarification usually comprises addition to the aqueous solution to be treated of certain chemicals known as coagulants, mixing of chemical additive and aqueous liquid whereby floc formation occurs, and subsequent removal of this floc by a variety of methods. In some cases, the addition of a second higher molecular weight water-soluble polymer, generally known as a flocculant may aid in the formation of floc. The removal of floc may be achieved by mechanical separation means or by merely allowing forces of gravity to work upon the agglomerated solids whereby a removable sludge layer is created.

Among effective coagulants for this purpose are water-soluble cationic polymers. These materials function by neutralizing the charge on the surface of the dispersed particles or droplets which allow the turbidity-causing materials present in turbid waters to agglomerate or coalesce, and to settle, or float to the top of the aqueous medium where they are collected and removed by techniques familiar to the those skilled in the art.

Water-soluble cationic polymers in conjunction with polynuclear aluminum species for clarifying waters containing turbidity-causing components are disclosed in U.S. Pat. No. 4,655,934. The reaction products of phenol, formaldehyde and low molecular weight polyamines useful for removing turbidity from low turbidity industrial waste waters are disclosed in U.S. Pat. No. 4,308,149.

Combinations of silica and polymers have been disclosed for some applications. The use of polymeric coagulants and aqueous colloidal silica sol for paint detackification is disclosed in U.S. Pat. Nos. 4,863,615; 5,004,550 and 4,153, 548. A treatment of cationic coagulant, flocculant and colloidal silica was found to enhance the dewatering of paper in U.S. Pat. No. 4,795,531. However, none of these patents disclose methods for the reduction of turbidity, or compositions of colloidal silica blended with cationic polymers.

SUMMARY OF THE INVENTION

This invention relates to the clarification of natural waters containing turbidity-causing components. This method comprises the addition of a stable colloidal silica suspension and water based polymeric coagulant to the turbid water. The components of the invention may be added independently, or blended together so that addition is simultaneous. The colloidal silica may also be conditioned by passing over a cationic exchange resin prior to addition of cationic polymer. The term conditioned as used herein refers to the act of passing the colloidal silica over a cationic exchange resin.

DESCRIPTION OF THE INVENTION

The cationic water-soluble polymer includes any water-soluble polymer which carries or is capable of carrying a cationic charge when dissolved in water, whether or not that charge-carrying capacity is dependent upon pH. The cationic water-soluble polymer may be poly(diallyldimethyl ammonium chloride), copolymers containing diallyldimethyl ammonium chloride and another monomer, poly (epichlorohydrin/dimethylamine), cationized starch or the like. Typically, the water-soluble cationic polymers have a molecular weight of about 2,000 to about 2,000,000.

Aqueous colloidal silica sols are produced by the neutralization with demetalization or deionization and subsequent concentration of sodium silicate. Likewise, aqueous colloidal silica sols can be produced by the hydrolysis of alkoxy silanes. The starting aqueous silica sol can range from 20 to 60 percent by weight of discrete, dense colloidal particles of amorphous silica. Typical commercial silica sols are those set forth below in Table I. The products listed below are all commercially available from Nalco Chemical Company, One Nalco Center, Naperville, Ill. 60563-1198.

One method of the manufacture of the silica sols is set forth and described in U.S. Pat. No. 3,901,992, which is incorporated herein by reference.

TABLE I

| Silica Sol | % Silica | Specific Gravity | Particle Size (nm) | pH |
|---|---|---|---|---|
| A | 15 | 1.100 | 4 | 10.4 |
| B | 30 | 1.21 | 8 | 10.0 |
| C | 30 | 1.20 | 13 | 10.2 |
| D | 40 | 1.30 | 15 | 9.7 |
| E | 50 | 1.39 | 20 | 9.0 |
| F | 50 | 1.39 | 60 | 8.5 |
| G | 40 | 1.30 | 80 | 8.4 |
| H | 14.5 | 1.10 | 5 | 9.0 |
| I | 40 | 1.29 | 20 | 9.3 |
| J | 34 | 1.23 | 20 | 3.0 |

Aqueous silica sol stabilization by placing silica sols in contact with strong acid cationic exchange resins are disclosed in U.S. Pat. Nos. 3,867,304; 3,855,145 and 3,822,216, which are hereby incorporated by reference.

The invention is a method for clarifying natural water containing turbidity-causing components which comprises:
a) adding to said water
  (i) an effective turbidity-reducing amount of an aqueous colloidal silica with an average particle size within the range from 1 to 150 nm wherein the aqueous colloidal silical sol is conditioned by contacting said sol with a strong acid cation exchange resin, blended with
  (ii) an effective turbidity-reducing amount of a water-soluble polymeric coagulant having a molecular weight within the range of from about 2,000 to about 2,000,000 wherein said coagulant is selected from the group consisting of poly(diallyl dimethyl ammonium chloride), poly(diallyl dimethyl ammonium chloride/acrylic acid), poly(epichlorohydrin/dimethylamine), poly(ethylene dichloride/ammonia) and cationized starch;
(b) mixing said colloidal silica, said coagulant and said water with a mechanical stirring device for sufficient time to allow flocculation of the turbidity causing components; and then,
(c) separating the flocculated turbidity-causing components from the water to obtain clarified water. As used herein, the term natural waters encompasses surface waters, including lakes, rivers, creeks, bayous, reservoirs and subterranean waters such as well water. As used herein, the term turbidity-causing components encompasses clay (aluminosilicates) and silt particles, humic acids, bacteria, algae, invertebrates, iron hydrous oxide and manganese oxide particles, other metal hydroxides and oxides, asbestos and other minerals and various synthetic contaminants such as oil and grease.

The mechanical stirring device may be a reactor containing a stirrer, a clarifier, bends in piping or in-line stirrers in piping.

In another embodiment, the invention is a method for clarifying natural water containing turbidity-causing components which comprises:
a) adding to said water
  i) an effective turbidity-reducing amount of an aqueous conditioned colloidal silica with an average particle size within the range of from 1 to 150 nm wherein the aqueous colloidal silica sol is conditioned by contacting said sol with a strong acid cation exchange resin, blended with
  ii) an effective turbidity-reducing amount of a water-soluble polymeric coagulant having a molecular weight within the range of from about 2,000 to about 2,000,000 wherein said coagulant is selected from the group consisting of poly(diallyl dimethyl ammonium chloride), poly(diallyl dimethyl ammonium chloride/acrylic acid), poly(epichlorohydrin/dimethylamine), poly(ethylene dichloride/ammonia) and cationized starch;
b) mixing the colloidal silica/polymer blend with said water with a mechanical stirring device for sufficient time to allow flocculation of the turbidity-causing components; and then,
c) separating the flocculated turbidity-causing components from the water to obtain clarified water.

The invention in another embodiment is a composition of matter comprising
a) an aqueous colloidal silica sol with an average particle size within the range of from 1 to 150 nm, and
b) a water-soluble cationic polymer having a molecular weight within the range of from about 2,000 to about 2,000,000 selected from the group consisting of poly(diallyl dimethyl ammonium chloride), poly(diallyl dimethyl ammonium chloride/acrylic acid), poly(epichlorohydrin/dimethyl amine), poly(ethylene dichloride/ammonia) and cationized starch, wherein the water-soluble cationic polymer and the silica sol are present in a weight ratio of silica to polymer of from 100:1 to 1:1.

Alternatively, the invention is a composition of matter comprising:
a) an aqueous conditioned silica sol with an average particle size within the range of from 1 to 150 nm wherein the silica sol is conditioned by contacting said sol with a strong acid cationic exchange resin, blended with
b) a water-soluble cationic polymer having a molecular weight within the range of about 2,000 to about 2,000,000 selected from the group consisting of poly(diallyl dimethyl ammonium chloride), poly(diallyl dimethyl ammonium chloride/acrylic acid), poly(epichlorohydrin/dimethyl amine), and cationized starch, wherein the water-soluble cationic polymer and the silica sol are present in a weight ratio of silica to polymer of from 100:1 to 1:1. A method of producing cationized starch is disclosed. In U.S. Pat. No. 4,568,721 which is hereby incorporated by reference. The cationic exchange resin is pre-treated with an acid solution. Typical solutions are aqueous solutions of acids such as $HNO_3$, $H_2SO_4$ and HCl. After passing the silica through the cationic exchange resin, an appropriate water-soluble cationic polymer is blended with the exchanged colloidal silica solution.

The invention in another embodiment is a process for preparing a silica sol/water-soluble cationic polymer mixture which comprises the steps of:
a) blending an aqueous conditioned silica sol with an average particle size within the range of from 1 to 150 nm wherein the silica sol is conditioned by contacting said sol with a strong acid cationic exchange resin with
b) a water-soluble cationic polymer having a molecular weight within the range of from about 2,000 to about 2,000,000 selected from the group consisting of poly(diallyl dimethyl ammonium chloride), poly(diallyl dimethyl ammonium chloride/acrylic acid), poly (epichlorohydrin/dimethyl amine), poly(ethylene dichloride/ammonia) and cationized starch, wherein the water-soluble cationic polymer and the silica sol are present in a weight ratio of silica to polymer of from 100:1 to 1:1.

In any of the embodiments, the water-soluble polymeric coagulant is selected from the group consisting of poly (diallyl dimethyl ammonium chloride), poly (epichlorohydrin/dimethylamine), poly(ethylene dichloride/ammonia), poly(diallyl dimethyl ammonium chloride/acrylic acid) and cationized starch. The weight ratio of the silica sol to the water-soluble polymeric coagulant is from 100:1 to 1:1, preferably from 50:1 to 2:1 and most preferably from 25:1 to 5:1.

Moreover, water-soluble polymer flocculants which may be used in conjunction with the coagulant/silica sol compositions described herein can be vinylic polymers containing at least 10 mer percent of a cationic monomer chosen from the group consisting of; allylamine, dimethylaminoethylmethacrylate, dimethylamino ethylmethacrylate quaternized with dimethyl sulfate, diallyl cyclohexohexylamine hydrochloride, diallyl dimethyl ammonium chloride, dimethyl aminoethyl acrylate and/or its acid salts, methacrylamidopropyl trimethyl ammonium chloride, 1-acrylamido-4-methyl piperazine quaternized with methylchloride, or dimethyl sulfate, diethylaminoethyl acrylate and/or its acids salts, diethylaminoethyl methacrylate and/or its acid salts, dimethylaminoethyl acrylamide and/or its acid salts, dimethylaminoethyl methylacrylamide and/or its acid salts, diethylaminoethyl acrylamide and/or its acid salts, diethylaminoethyl methacrylamide and/or its acid salts, and mixtures thereof. The turbidity-causing components are suspended solids and dispersed or emulsified oils and grease, among others. Dosages are dependant upon the type of turbidity-causing components and the type of water treated. Silica may be treated in from about 0.25 to about 2,000 mg/L and cationic polymer may also be treated in from about 0.25 to about 2,000 mg/L.

The following examples are presented to describe preferred embodiments and utilities of the invention and are not meant to limit the invention unless otherwise stated in the claims appended hereto.

EXAMPLE 1

Water to be treated was obtained from a midwestern river. A standard jar test procedure was performed using a Phipps and Bird 6 station unit with light box for mixing. To a 1000 ml jar was added 500 ml of waste water. Subsequently 0.1 ml of a 15% by weight colloidal silica was added to the jar and mixed for one minute at 100 rpm. Then 0.1 ml of an epichlorohydrin/dimethylamine copolymer solution [poly (epi/DMA)] polymer at 0.5% actives was added to the jar and mixed for one minute at 100 rpm. The order of addition of the silica and polyelectrolyte is significant as greater activity is demonstrated when silica is added before the polyelectrolyte. Next, the treated waste water solution was mixed slowly at 30 rmp for 15 minutes, followed by 15 minutes without stirring to allow the floc to settle to the bottom of the jar.

After settling, 25 mls were drawn off of the top of each sample with a syringe. The turbidity of this aliquot was measured using a Hach P2100 turbidimeter. Residual silica was determined by ICP analysis.

The results are shown in Table II for river water (also referred to as a raw water). The colloidal silica/poly(epi-DMA) treatment of this invention produces results comparable to that of the conventional polyaluminum chloride treatment without significantly increasing residual aluminum in solution. By decreasing the amount of soluble aluminum, fouling of ion exchange resins in demineralizer systems and membranes in reverse osmosis systems in downstream water treatment processes is reduced. Also, the invention does not produce as much residual silica as conventional treatments. The results may be contrasted to those obtained for sodium silicate, which causes an increase in residual silica and is not as efficient in turbidity reduction.

TABLE II

Turbidity Removal in Raw Waste Water[1]

| Treatment | Treatment Dosage (ppm) | Epi/DMA Polymer Dosage (ppm) | Turbidity (NTU) | Residual Si (ppm) |
|---|---|---|---|---|
| Polyaluminum Chloride | 20 | — | 13.6 | 5.1 |
| Polyaluminum Chloride | 25 | — | 10.7 | 5.5 |
| Polyaluminum Chloride | 30 | — | 8.70 | 5.2 |
| Polyaluminum Chloride | 35 | — | 7.09 | 5.3 |
| Polyaluminum Chloride | 40 | — | 5.51 | 5.1 |
| Polyaluminum Chloride | 45 | — | 4.13 | 5.3 |
| Colloidal Silica[2] | 3 | 4 | 12.4 | 5.3 |
| Colloidal Silica[2] | 6 | 4 | 5.26 | 5.7 |
| Colloidal Silica[2] | 9 | 4 | 3.90 | 6.4 |
| Colloidal Silica[2] | 12 | 4 | 3.01 | 6.3 |
| Colloidal Silica[2] | 15 | 4 | 4.61 | 6.2 |
| Colloidal Silica[2] | 18 | 4 | 5.61 | 6.7 |
| Sodium Silicate[3] | 2.9 | 4 | 23.9 | — |
| Sodium Silicate[3] | 5.8 | 4 | 33.7 | — |
| Sodium Silicate[3] | 8.7 | 4 | 44.7 | — |
| Sodium Silicate[3] | 11.6 | 4 | 45.0 | 22.4 |
| — | — | — | 51.4 | 4.2 |

[1] = pH = 8.07
[2] = 15% Actives
[3] = 29.2% Actives

EXAMPLE 2

The experimental procedure described in Example 1 was utilized to obtain the results shown in Table III. In this example, the procedure was slightly modified because the colloidal silica and epi/DMA were blended together prior to addition to the raw water to be clarified.

For the blended treatments, colloidal silica solutions in a 15 percent by weight of silica with an average particle diameter of 4 nm are passed through an Amberlite IR-120 cationic exchange resin available from Rohm & Haas in Philadelphia, Pa. at a rate of 0.2 ml/min. The cationic exchange resin is pretreated with a 2N HNO$_3$ solution. After passing the silica through the cationic exchange resin, a poly(epichlorohydrin/dimethylamine) of 20,000 weight average molecular weight was blended with the activated colloidal silica solution.

TABLE III

Turbidity Removal Comparison of Blend to Conventional Treatment in Raw Waste Water

| Dosage[1] (ppm) | Polyaluminum Chloride (NTU) | Blend 1[2] (NTU) | Blend 2[3] (NTU) | Blend 3[4] (NTU) |
|---|---|---|---|---|
| 3.1 | — | — | 72.9 | — |

TABLE III-continued

Turbidity Removal Comparison of Blend to Conventional Treatment in Raw Waste Water

| Dosage¹ (ppm) | Polyaluminum Chloride (NTU) | Blend 1² (NTU) | Blend 2³ (NTU) | Blend 3⁴ (NTU) |
|---|---|---|---|---|
| 6.2 | — | — | 68 | — |
| 9.3 | — | — | 64.9 | 38.4 |
| 12.4 | — | — | 53.5 | 17.5 |
| 15.5 | — | — | 30 | 11.1 |
| 18.6 | — | — | 27 | 10.3 |
| 21.7 | — | 34.5 | 26.5 | 9.6 |
| 24.8 | — | 27.8 | 16.3 | 8.62 |
| 27.9 | 30.2 | 24.9 | 6.69 | 7.3 |
| 31 | 26 | 18.2 | 5.87 | 5.62 |
| 34.1 | — | 8.39 | 4.03 | 5.22 |
| 37.2 | 17.9 | 7.35 | 9.38 | 4.73 |
| 40 | 13.3 | — | — | — |
| 44 | 12.2 | — | — | — |
| 48 | 9.14 | — | — | — |

¹= at no treatment, turbidity is 68.6; dosage 5 based on amount of silica
²= 17:1 weight percent ratio of colloidal silica to epi/DMA copolymer
³= 17:2 weight percent ratio of colloidal silica to epi/DMA copolymer
⁴= 17:4 weight percent ratio of colloidal silica to epi/DMA copolymer

EXAMPLE 3

The experimental procedure described in Example 2 was utilized to obtain the results shown in Table IV. Here, the blended treatments of Example 2 were compared to the dual treatments of Example 1, in a synthetic oily waste water prepared by mixing 0.1 ml of castor oil for 25 sec. with 4 L of hot water. The turbidity of the emulsion was 15 NTU.

TABLE IV

Comparison of Blend to Dual Treatment for Turbidity Removal from Synthetic Oily Water

| Dosage¹ (ppm) | Blend 1² (NTU) | Blend 2³ (NTU) | Dual⁴ |
|---|---|---|---|
| 1.4 | 8.15 | — | 8.54 |
| 1.6 | — | — | — |
| 2.8 | 3.32 | — | 7.1 |
| 3.2 | — | 12 | — |
| 3.5 | 3.4 | — | — |
| 4.2 | — | — | 4.55 |
| 4.9 | 2.59 | 7.38 | — |
| 5.6 | 3.66 | — | 2.86 |
| 6.4 | — | 4.76 | — |
| 7 | 2.48 | — | 2 |
| 8 | — | 2.99 | — |
| 8.4 | 4.04 | — | 2.23 |
| 9.6 | — | 4.65 | — |
| 9.8 | 2.28 | — | 2.1 |
| 11.2 | 3.29 | 5.15 | — |
| 12.6 | 3.77 | — | — |
| 12.8 | — | 7.88 | — |
| 14 | 3.9 | — | — |

¹ = at no treatment, turbidity is 16.7; dosage 5 based on amount of silica
² = 7:1 weight percent ratio of colloidal silica (A) to epi/DNIA copolymer
³ = 17:1 weight percent ratio of colloidal silica (J) to epi/DMA copolymer
⁴ = Colloidal silica and 1 ppm epi/DMA copolymer dosed independently, as described in Example 1.

Changes can be made in the composition, operation and arrangement of the method of the present invention described herein without departing from the concept and scope of the invention as defined in the following claims:

We claim:

1. A method for clarifying natural water containing turbidity-causing components which comprises:
   a) adding to said water
      (i) an effective turbidity reducing amount of an aqueous colloidal silica sol with an average particle size within the range from 1 to 150 nm and, subsequently
      (ii) an effective turbidity-reducing amount of a water-soluble polymeric coagulant having a molecular weight within the range of from about 2,000 to about 2,000,000 wherein said coagulant is selected from the group consisting of poly(diallyl dimethyl ammonium chloride), poly(diallyl dimethyl ammonium chloride/acrylic acid), poly(epichlorohydrin/dimethylamine), poly(ethylene dichloride/ammonia) and cationized starch;
   (b) mixing said colloidal silica, said coagulant and said water with a mechanical stirring device for sufficient time to allow flocculation of the turbidity causing components; and then,
   (c) separating the flocculated turbidity-causing components from the water to obtain clarified water.

2. The method of claim 1 wherein the turbidity-causing components are suspended solids.

3. The method of claim 1 wherein the turbidity-causing components are oil and grease.

4. The method of claim 1 wherein the water-soluble polymeric coagulant and the silica sol are present in a weight ratio of silica to polymer of from 100:1 to 1:1.

5. The method of claim 1 wherein the water-soluble polymeric coagulant and the silica sol are present in a weight ratio of silica to polymer of from 50:1 to 2:1.

6. The method of claim 1 wherein the water-soluble polymeric coagulant and the silica sol are present in a weight ratio of silica to polymer of from 25:1 to 5:1.

7. A method for clarifying natural water containing turbidity-causing components which comprises:
   a) adding to said water
      i) an effective turbidity-reducing amount of an aqueous conditioned colloidal silica with an average particle size within the range of from 1 to 150 nm wherein the aqueous colloidal silica sol is conditioned by contacting said sol with a strong acid cation exchange resin, blended with
      ii) an effective turbidity-reducing amount of a water-soluble polymeric coagulant having a molecular weight within the range of from about 2,000 to about 2,000,000 wherein said coagulant is selected from the group consisting of poly(diallyl dimethyl ammonium chloride), poly(diallyl dimethyl ammonium chloride/acrylic acid), poly(epichlorohydrin/dimethylamine), poly(ethylene dichloride/ammonia) and cationized starch;
   b) mixing the colloidal silica/polymer blend with said water with a mechanical stirring device for sufficient time to allow flocculation of the turbidity-causing components; and then,
   c) separating the flocculated turbidity-causing components from the water to obtain clarified water.

8. The method of claim 7 wherein the turbidity-causing components are suspended solids.

9. The method of claim 7 wherein the turbidity-causing components are oil and grease.

10. The method of claim 7 wherein the water-soluble polymeric coagulant and the silica sol are present in a weight ratio of silica to polymer of from 100:1 to 1:1.

11. The method of claim 7 wherein the water-soluble polymeric coagulant and the silica sol are present in a weight ratio of silica to polymer of from 50:1 to 2:1.

12. The method of claim 7 wherein the water-soluble polymeric coagulant and the silica sol are present in a weight ratio of silica to polymer of from 25:1 to 5:1.

* * * * *